(12) United States Patent
Krishnamoorthy et al.

(10) Patent No.: US 7,539,418 B1
(45) Date of Patent: May 26, 2009

(54) INTEGRATED RING MODULATOR ARRAY WDM TRANSCEIVER

(75) Inventors: Ashok V. Krishnamoorthy, San Diego, CA (US); John E. Cunningham, San Diego, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 555 days.

(21) Appl. No.: 11/228,917

(22) Filed: Sep. 16, 2005

(51) Int. Cl.
*H04J 14/02* (2006.01)
*H04B 10/00* (2006.01)

(52) U.S. Cl. .............................. 398/82; 398/48; 398/135
(58) Field of Classification Search ............. 398/48–51, 398/135, 139, 141, 142
See application file for complete search history.

(56) References Cited

U.S. PATENT DOCUMENTS

| | | | |
|---|---|---|---|
| 6,317,539 B1 * | 11/2001 | Loh et al. | 385/37 |
| 2004/0081386 A1 * | 4/2004 | Morse et al. | 385/15 |
| 2004/0114930 A1 * | 6/2004 | Krug et al. | 398/79 |
| 2004/0234273 A1 * | 11/2004 | Sayyah et al. | 398/149 |

FOREIGN PATENT DOCUMENTS

JP 2005-091467 * 7/2005

* cited by examiner

*Primary Examiner*—Nathan M Curs
(74) *Attorney, Agent, or Firm*—Park, Vaughan & Fleming LLP

(57) ABSTRACT

A system that facilitates optical multiplexing and demultiplexing. The system includes an optical transmitter which is structured in the following way. A wavelength-splitting mechanism is coupled to the optical transmitter, which separates the wavelengths of light onto an array of input-optical-waveguide busses within the optical transmitter. An array of ring modulators within the optical transmitter is coupled to each optical-waveguide bus, wherein the input-end of a given ring modulator is coupled to a corresponding input-optical-waveguide bus. Output-optical-waveguide busses within the optical transmitter are coupled to the array of ring modulators, wherein the output-end of each ring modulator is coupled to a corresponding output-optical-waveguide bus. When a modulation signal is applied to a given ring modulator within the array of ring modulators, a specific wavelength of light is directed to the corresponding output-optical-waveguide bus.

19 Claims, 4 Drawing Sheets

INTEGRATED RING MODULATOR ARRAY WDM TRANSCEIVER

BACKGROUND

1. Field of the Invention

The present invention relates to the design of optical transceivers. More specifically, the present invention relates to a multi-dimensional wavelength-division-multiplexing (WDM) transceiver that permits multiple WDM transceivers to be co-located on a single semiconductor chip.

2. Related Art

Optical transceivers convert high-speed electrical signals into optical signals (and vice-versa) for transmission through fiber optic cables. Optical transceivers are also commonly used for communicating data between electronic components within a datacenter. These optical transceivers populate the boards and cards within a data communications or telecommunications chassis, and communicate to other chips within the chassis.

One factor that limits the capacity of optical transceivers, and hence the communication capacity between electronic components within the system, is the total number of lasers or optical modulators that can be integrated into the transceiver package. Since the cost of the transceiver is a function of the cost of the active optical components and the packaging of these components, it is desirable that as many optical components be integrated onto one semiconductor chip as possible. This is also of particular importance as the performance of the transceivers increases.

In high-end systems applications, a large gap exists between the I/O bandwidth density required on an electronic chip versus what present-day optical interconnect technology is capable of delivering. Although significant advances in off-chip electrical I/O and signaling density have been achieved for short transmission lengths, off-chip electrical I/O has many disadvantages, including high electrical power dissipation and limited transmission length (approximately one meter).

An optical interconnect solution is desirable to transport very large aggregate bandwidths over many meters. Unfortunately, existing optical technology cannot meet the bandwidth requirements in a package comparable to the size of the chip. For example, electrical interconnect density can be as high as 4 Tb/s in a one square-centimeter chip. However, existing optical solutions can only achieve 10-100 times smaller bandwidth onto such a chip. The current optical interconnect solutions have fallen far behind electrical interconnect densities, and the gap continues to widen.

Another limitation of the existing optical interconnect technologies is that they have traditionally been based on technology platforms that differ significantly from those for an electronic chip (e.g. III-V compound semiconductor photonics versus silicon-based circuits). Options to integrate these different technologies together require a hybrid or a heteroepitaxy materials integration solution. However, neither of these techniques has been proven at wafer-level integration. If such integration is to be practiced on a large scale, wafer-level integration is necessary to facilitate a low-cost solution for optical interconnects and to deliver prices competitive with electrical interconnects.

Another issue is that III-V photonics has historically been based on forward-biased devices which operate in an emitting geometry. These devices are ideal in applications where the total number of components is low. However, in applications requiring a large number of emitter components for high interconnect density, the device reliability of these forward-biased devices is a drawback. Component failure is so severe that the resulting chip interface is rendered useless.

Yet another issue is that the optical and electrical technologies are governed by different technology roadmaps and hence don't share a common scaling parameter. This issue ultimately makes it very difficult for system designers to anticipate the design of future generations of optical transceivers.

Hence, what is needed is an optical transceiver without the problems described above.

SUMMARY

One embodiment of the present invention provides a system that facilitates optical multiplexing and demultiplexing. The system includes an optical transmitter which is structured in the following way. A wavelength-splitting mechanism is coupled to the optical transmitter, which separates the wavelengths of light onto an array of input-optical-waveguide busses within the optical transmitter. An array of ring modulators within the optical transmitter is coupled to each optical-waveguide bus, wherein the input-end of a given ring modulator is coupled to a corresponding input-optical-waveguide bus. Output-optical-waveguide busses within the optical transmitter are coupled to the array of ring modulators, wherein the output-end of each ring modulator is coupled to a corresponding output-optical-waveguide bus. When a modulation signal is applied to a given ring modulator within the array of ring modulators, a specific wavelength of light is directed to the corresponding output-optical-waveguide bus.

In a variation on this embodiment, the wavelength-splitting mechanism is an arrayed waveguide grating (AWG), and the wavelengths of light on each optical-waveguide bus are separated by multiples of the free spectral range of the wavelength-splitting mechanism.

In a variation on this embodiment, the ring modulator provides coarser separation of the wavelengths of light than the wavelength spacing generated by the external light source. Note that the ring modulator modulates one wavelength of light.

In a variation on this embodiment, the system further includes an external light source which generates a plurality of wavelengths of light, wherein the external light source comprises a bank of distributed feedback lasers configured in a dense-wavelength-division-multiplexing (DWDM) optical configuration. An optical multiplexer is coupled to the external light source which combines the wavelengths of light onto a single-mode fiber. An optical splitter is coupled to the optical multiplexer, which splits the plurality of wavelengths of light into separate beams of light containing all of the wavelengths of light from the external light source. The system also includes optical amplifiers, which boost the optical power of the split beams of light. The input of the optical amplifier is coupled to the optical splitter, and the output of the optical amplifier is coupled to the optical transmitter. Note that the optical multiplexer can be a dense-wavelength-division-multiplexing multiplexer, and the optical amplifier can be an erbium-doped fiber amplifier.

In a variation on this embodiment, the system further comprises a second optical multiplexer coupled to each output-optical-waveguide bus, which recombines the separate wavelengths of light onto a single-mode fiber.

In a variation on this embodiment, the system further comprises an optical receiver which is structured as follows. A second optical multiplexer is coupled to the output-optical-waveguide busses within the optical transmitter, which combines the wavelengths of light onto a single-mode fiber, wherein the second optical multiplexer is a dense-wavelength-division-multiplexing (DWDM) multiplexer. A second wavelength-splitting mechanism is coupled to the single-mode fiber, wherein the second wavelength-splitting mechanism separates the wavelengths of light onto a second array of input-optical-waveguide busses within an optical receiver. An array of ring modulators within the optical receiver is coupled to the input-optical-waveguide busses, wherein the input-end of a given ring modulator in the array of ring modulators is coupled to a corresponding input-optical-waveguide bus. Furthermore, output-optical-waveguide busses within the optical receiver are coupled to each array of ring modulators, wherein the output-end of each ring modulator in a given array of ring modulators is coupled to a corresponding output-optical-waveguide bus. Finally, edge-coupled detectors located on the output-optical-waveguide busses are coupled to each ring modulator. Note that each edge-coupled detector detects a corresponding wavelength of light output from a corresponding ring modulator when a DC reverse-bias is applied to the corresponding ring modulator.

In a variation on this embodiment, the optical transmitter and the optical receiver are located on a module interface chip.

In a variation on this embodiment, the edge-coupled detectors are fabricated using silicon-germanium materials, germanium materials, or III-V materials coupled to CMOS silicon chips.

In a variation on this embodiment, rapidly changing the modulation signal applied to a given ring modulator modulates data on the corresponding wavelength of light, and the apparatus is configured to direct the corresponding wavelength of light to the output-optical-waveguide bus.

In a variation on this embodiment, the wavelength-splitting mechanism comprises resonant ring modulators.

In a variation on this embodiment, the wavelength-splitting mechanism comprises resonant photonic crystal structures.

In a variation on this embodiment, the resonant photonic crystal structures are photonic crystal ring resonators.

In a variation on this embodiment, the array of ring modulators is replaced by other nanophotonic resonant structures.

In a variation on this embodiment, the wavelength-splitting mechanism is a free-space grating that separates the wavelengths of light off-chip and is coupled to the array of ring modulators.

In a variation on this embodiment, the free-space grating is located above an integrated circuit chip which contains the array of ring modulators.

In a variation on this embodiment, the wavelength-splitting mechanism is one of: fiber Bragg gratings, traditional gratings, thin film filters, and waveguide gratings fabricated on-chip.

In a variation on this embodiment, the ring modulators are fabricated on silicon wafers.

In a variation on this embodiment, the ring modulators are fabricated on III-V materials and are coupled to waveguide busses on silicon chips.

In a variation on this embodiment, the ring modulators are fabricated on resonantly-enhanced planar waveguides.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Integrated WDM Transceiver

The present invention provides efficient structures and techniques for constructing dense, parallel optical transceivers with large aggregate bandwidths. These optical transceivers contain many parallel channels that can scale to an aggregate capacity of multiple terabits-per-second and beyond. In one embodiment of the present invention, Wavelength-Division-Multiplexing (WDM) is used to enable the parallel optical channels to use separate wavelengths and ultimately to be combined onto a single fiber. One embodiment of the present invention combines parallel fibers and reuses the multiple wavelengths in each fiber to address a large and dense array of optical transmitters and optical receivers on a semiconductor chip. One embodiment of the present invention uses reverse-biased optical modulator devices with higher reliability than corresponding forward-biased optical emitters. In one embodiment of the present invention, the optical transceivers are compatible with silicon materials, and more specifically silicon CMOS-compatible photonics.

Figure 1:
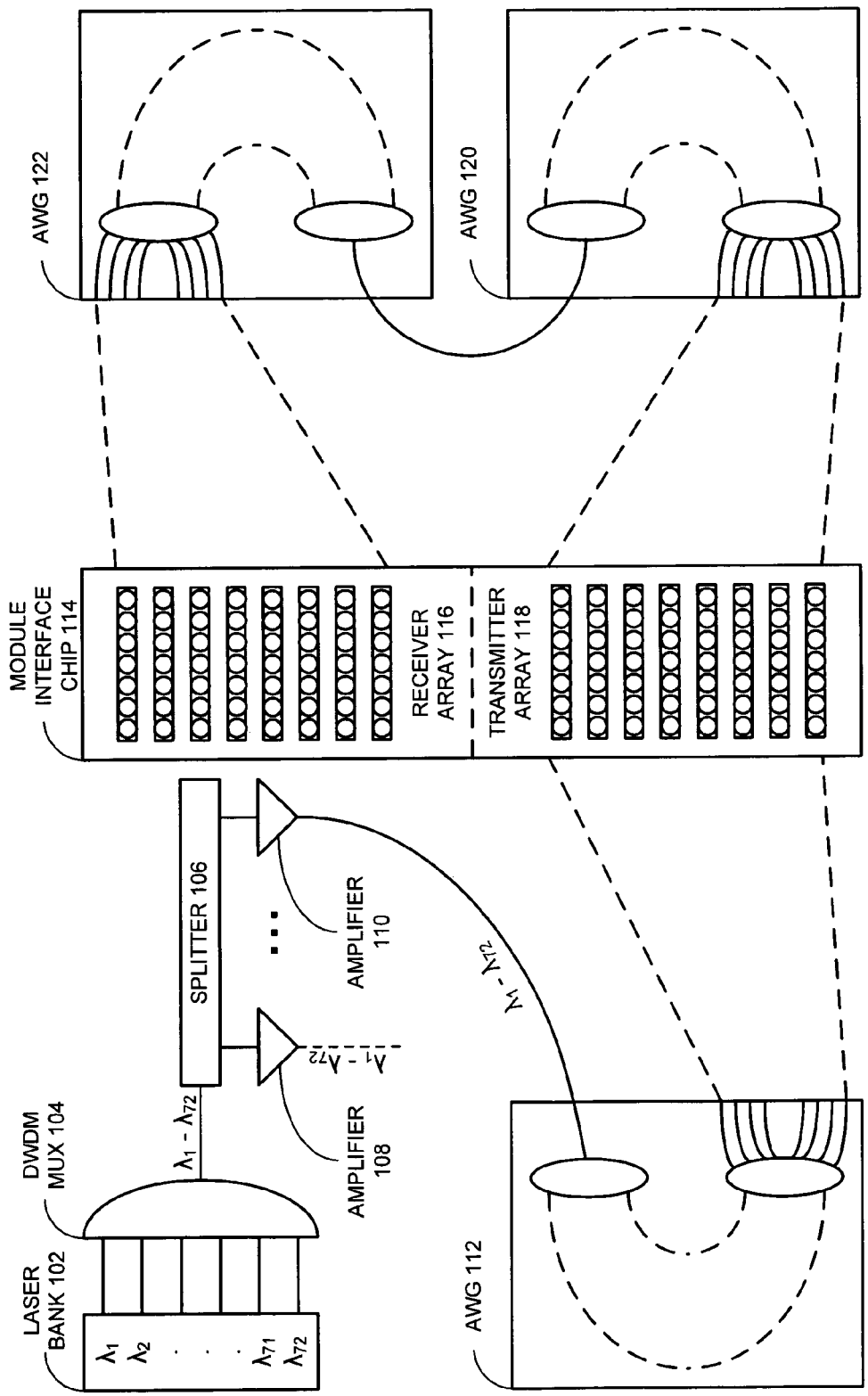
FIG. 1 illustrates an integrated WDM transceiver in accordance with an embodiment of the present invention.

FIG. 1 illustrates an integrated WDM transceiver in accordance with an embodiment of the present invention. Module interface chip 114 (which provides an optical interface) contains receiver array 116 and transmitter array 118. Receiver array 116 and transmitter array 118 transport data to and from module interface chip 114. Laser bank 102 is an external optical source and provides the module interface chip with light. Note that laser bank 102 includes of a bank of 72 distributed-feedback (DFB) lasers configured on a Dense-WDM (DWDM) optical configuration. The 72 lasers are combined by DWDM multiplexer 104, which then combines all wavelengths of light onto a Single-Mode (SM) fiber. Typical laser wavelengths can be tied or locked to specific wavelength spacing to form a grid. Today, International Telecommunication Union (ITU) grids typically deploy 100 GHz spacing between neighboring channels, although 50 GHz and 25 GHz spacings are also possible.

Splitter 106, a 1×N splitter, splits the light beam into N beams of light each containing all of the wavelengths generated by laser bank 102. These wavelengths of light are used to power N module interface (MI) chips, one of which is module interface chip 114. Amplifiers 108 and 110 are Erbium-doped fiber amplifiers which boost optical power after the light beam is split by splitter 106. Each amplifier then feeds a module interface chip, such as module interface chip 114. Note that some high-performance computing systems may need many thousands or even tens of thousands of MI chips.

To accomplish this, a central laser supply can be used with the appropriate number of amplifiers and splitters.

Note that the output of each amplifier can supply many wavelengths (e.g. 72 wavelengths is a convenient number for a high-performance computing system) to multiple MI chips. In one embodiment of the present invention, the wavelengths of light generated by a set of 72 lasers is transported to a single MI chip. A demultiplexing step is performed prior to interfacing transmitter array 118 on module interface chip 114. This demultiplexing step can be performed either on-chip or off-chip with arrayed waveguide grating (AWG) 112 or other wavelength splitting elements.

Figure 2:
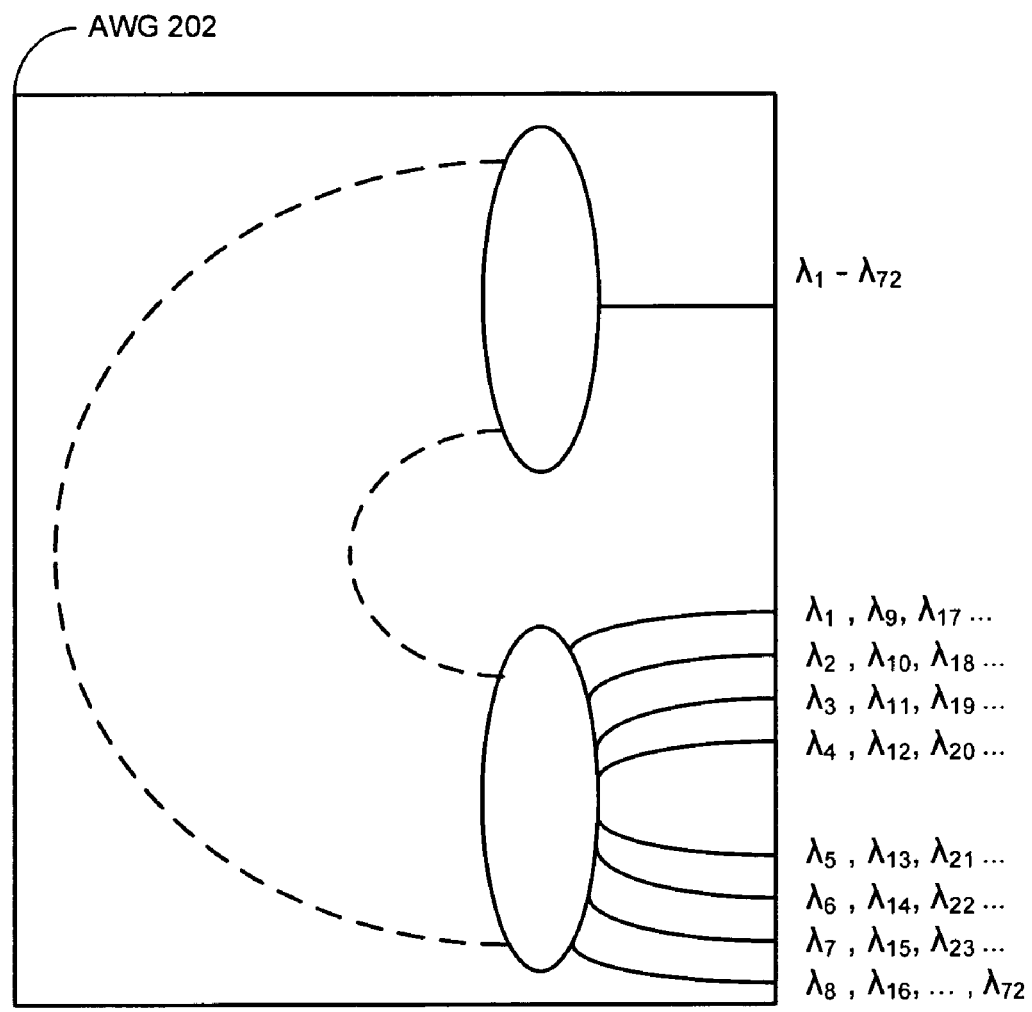
FIG. 2 illustrates an arrayed waveguide grating (AWG) with wavelength wrap-around in accordance with an embodiment of the present invention.

FIG. 2 illustrates arrayed waveguide grating (AWG) 202 with wavelength "wrap-around" in accordance with an embodiment of the present invention. Note that the wavelengths are separated by the AWG in a wrap-around characteristic. This repetitive property is an inherent feature of AWGs. As shown in FIG. 1 and FIG. 2, all 72 input wavelengths are output onto eight arms of the AWG such that each arm contains wavelengths incrementing by multiple orders of the free spectral range (FSR) of the demultiplexing AWG. In this configuration, each arm contains 9 wavelengths differing by 9 multiples of the FSR of the AWG. The first arm contains the set of wavelengths $\lambda_1$ plus n*FRS where n is an integer ranging from 0 to 8. Hence, the first arm contains 9 different wavelengths $\lambda_1, \lambda_9, \lambda_{17}, \ldots, \lambda_{65}$. The second arm contains wavelengths $\lambda_2, \lambda_{10}, \lambda_{18}, \ldots, \lambda_{66}$. The third arm contains wavelengths $\lambda_3, \lambda_{11}, \lambda_{19}, \ldots, \lambda_{67}$, while the last arm contains $\lambda_8, \lambda_{16}, \lambda_{24}, \ldots, \lambda_{72}$.

For example, suppose the wavelength spacing of the original input colors (the DWDM grid) is spaced by 50 GHz, or equivalently, 0.4 nm in wavelength separation. Hence, if $\lambda_1$ 1530 nm then $\lambda_2$ is 1530.4 nm, and soon. If the FSR of the AWG is 4 nm then $\lambda_9$ or wavelength 1533.2 nm would appear in the first output arm along with the wavelength 1530 nm.

Note that the wavelength splitting mechanism can include fiber Bragg gratings, traditional gratings, thin film filters, and waveguide gratings fabricated on chip. Each of these wavelength splitting mechanisms also exhibits the wavelength wrap around property.

In one embodiment of the present invention, the wavelength-splitting mechanism comprises resonant ring modulators.

In one embodiment of the present invention, the wavelength-splitting mechanism comprises resonant photonic crystal structures. Note that the resonant photonic crystal structures can include photonic crystal ring resonators.

In one embodiment of the present invention, the wavelength-splitting mechanism is a free-space grating that separates the wavelengths of light off-chip and is coupled to the array of ring modulators. Note that the free-space grating can be located above an integrated circuit chip which contains the array of ring modulators.

In one embodiment of the present invention, the wavelength-splitting mechanism includes fiber Bragg gratings, traditional gratings, thin film filters, or waveguide gratings fabricated on-chip.

Transmitter Array

In one embodiment of the present invention, the demultiplexing available via an AWG is combined with the inherent wavelength selectivity available in a ring modulator. In one embodiment of the present invention, the ring modulators are fabricated on silicon wafers.

Figure 3:
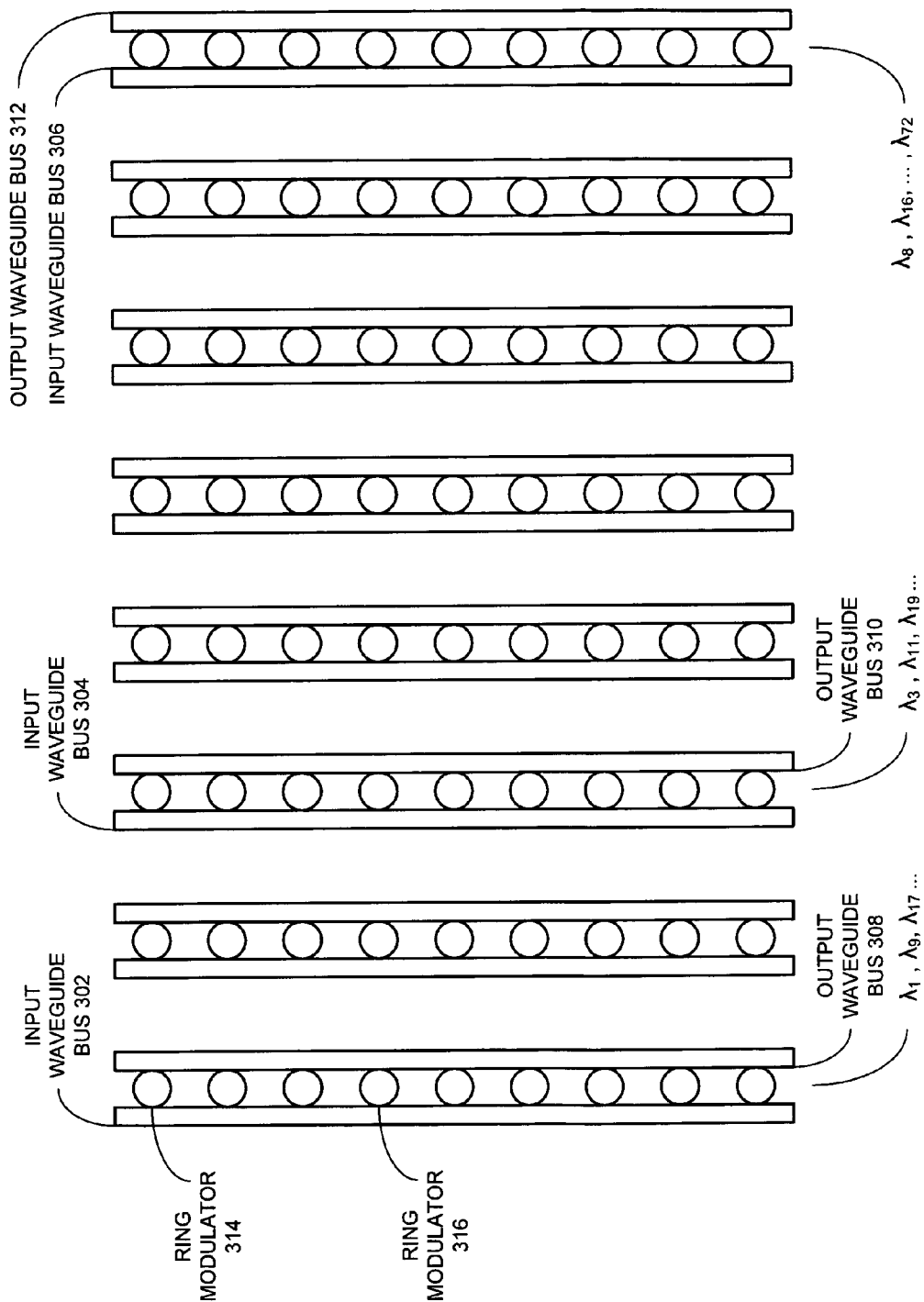
FIG. 3 illustrates a transmitter with waveguide busses and ring-modulators used for coarse wavelength demultiplexing in accordance with an embodiment of the present invention.

FIG. 3 illustrates a transmitter with waveguide busses and ring-modulators used for coarse wavelength demultiplexing in accordance with an embodiment of the present invention.

An AWG with wrap-around demultiplexing is combined with ring modulators to create an area-efficient optical demultiplexer design that reduces fabrication complexity, and improves manufacturability and yield.

FIG. 3 shows a layout of ring modulators configured as a transmitter array. The transmitter array is used with the continuous wave (CW) laser wavelengths that have already been demultiplexed by the AWG. The transmitter array on the MI chip contains an 8×9 array of ring modulators sharing common waveguide busses. Each column of the array contains of a linear array of 9 ring modulators, such as ring modulators 314 and 316, which couple to input waveguide busses, such as input waveguide busses 302, 304, and 306, and output waveguide busses, such as output waveguide busses 308, 310, and 312. For a given column, the input waveguide bus takes one of the output arm wavelengths from the AWG as shown in FIG. 1.

In one embodiment of the present invention, each ring modulator modulates only one specific wavelength. For example, if the first column of rings has the wavelength set $\lambda_1$, $\lambda_9, \lambda_{17}, \ldots, \lambda_{65}$ delivered on the input bus, and the first ring becomes activated, then only one wavelength ($\lambda_1$) drops onto the output waveguide bus. Using electrical biasing on the first ring changes whether $\lambda_1$ is either output to the output waveguide bus guide or remains on the input waveguide bus. Rapidly changing the electrical bias on this ring modulator (i.e. modulating the drive voltage to the ring modulator) modulates data onto wavelength $\lambda_1$ and directs $\lambda_1$ to the output waveguide bus. Similarly, the second ring modulator of this column modulates data onto $\lambda_9$, and directs $\lambda_9$ to the output waveguide bus. In a similar manner, data can be modulated on each of the 72 input wavelengths by the corresponding ring modulators.

Note that the detuning resonance of the ring modulator is not as sharp when compared with the channel spacing of the DWDM laser bank. For example, it is not possible to input all 72 wavelengths into a 1×72 long bused ring modulators configuration. In fact, the detuning characteristic of a small ring modulator causes multiple wavelengths to be identically modulated and to drop onto the output waveguide bus. Note that these wavelengths contain the same modulated data, thus interfering with data modulated by ring modulators in adjacent columns and causing severe cross-talk.

In contrast, the present invention uses the wide modulation bandwidth of the ring modulators in conjunction with the wrap-around characteristic of the AWG to supply densely modulated data channels. Since the ring pitch is small (<50 microns), the optical channel density can be made large. For optical interconnects with a VCSELs solution the channel spacing is on a 250 micron pitch. Hence, with ring modulators, the interconnect density is approximately 50 times more dense.

Note that the first output waveguide bus, output waveguide bus 302 in FIG. 3, contains modulated data on wavelengths $\lambda_1, \lambda_9, \lambda_{17}, \ldots, \lambda_{65}$, the third output waveguide bus, output waveguide bus 304 in FIG. 3, contains modulated data on wavelengths $\lambda_3, \lambda_{11}, \lambda_{19}, \ldots, \lambda_{67}$, and so forth. All eight output waveguide busses are combined and multiplexed together with AWG 120 shown in FIG. 1. AWG 120 can be either on or off of module interface chip 114. The output of AWG 120 multiplexes (aggregates) all the modulated data streams onto a single SM fiber to transport to a specific receiver module of another MI chip.

Receiver Array

In one embodiment of the present invention, each MI chip has a transmitter array and a receiver array on a single silicon chip. Integrating a parallel transmitter and receiver arrays on a single chip substantially reduces the cost compared to building receiver and transmitter functionality on separate chip.

Figure 4:
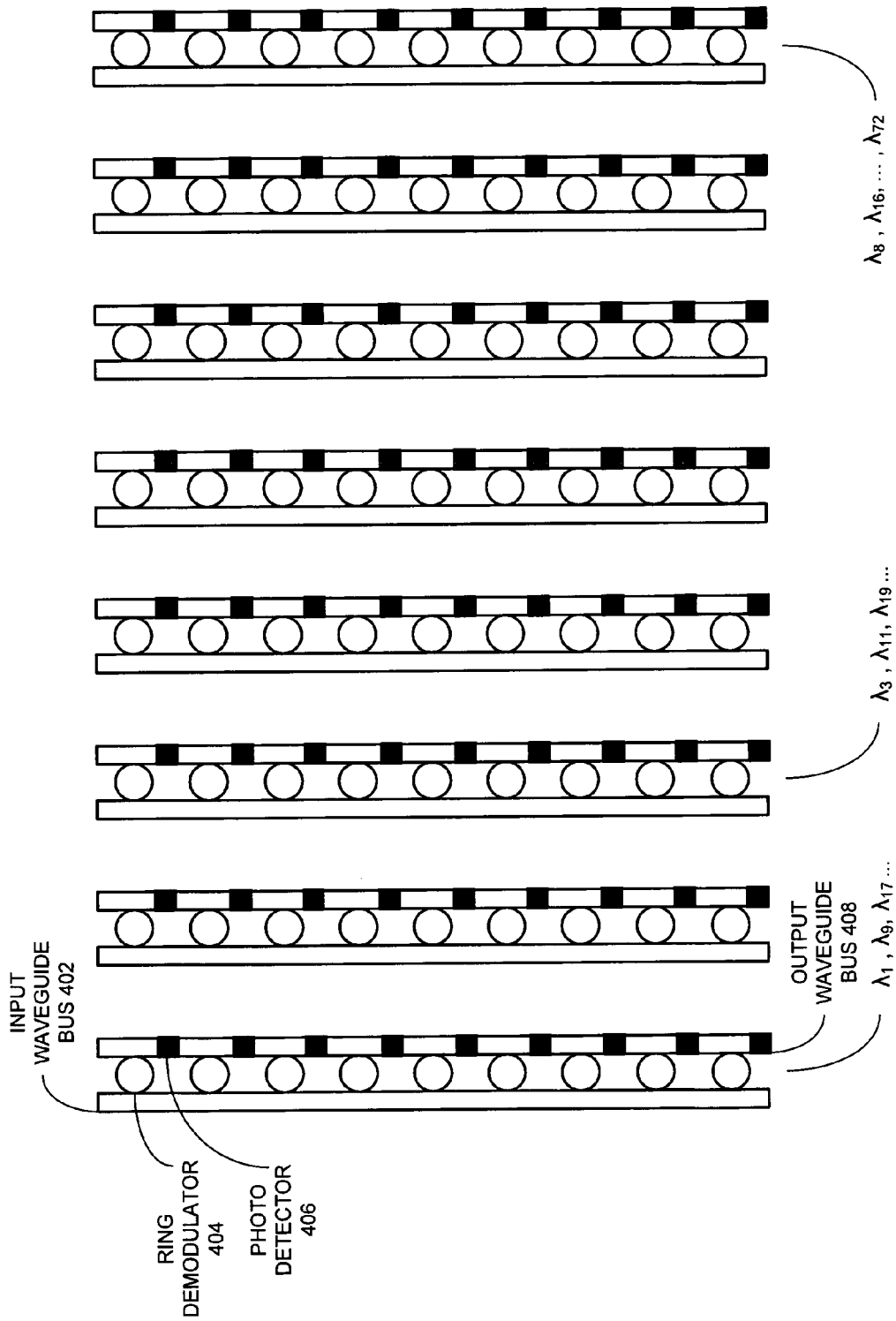
FIG. 4 illustrates an optical receiver with waveguide busses, ring-modulators, and photo-detectors in accordance with an embodiment of the present invention.

The demodulation function of the receiver array uses similar techniques as the transmitter array described above. FIG. 4 illustrates an optical receiver with waveguide busses, ring-modulators, and photo-detectors in accordance with an embodiment of the present invention. The ring modulators within receiver array 116 operate on a similar principle as the ring modulators located in transmitter array 118 in FIG. 1. The wavelengths from AWG 122 in FIG. 1 are input to the input waveguide guide busses in FIG. 4, such as input waveguide bus 402. These input waveguide busses are coupled to a linear array of ring demodulators, for example, ring demodulator 404. Each ring demodulator in a given column is coupled to an output waveguide bus which terminates into an edge-coupled detector configured as a planar waveguide. By applying the appropriate DC reverse-bias to the ring modulator, the wavelength corresponding to the ring modulator is directed to the output waveguide bus and is detected by the appropriate edge-coupled detector. For example, when ring demodulator 404 is activated with a DC reverse-bias, it sends the corresponding wavelength from input waveguide bus 402 to output waveguide bus 408 where photo detector 406 detects the light.

Note that the first photo detector in column 1 receives modulated data on $\lambda_1$, the second photo detector receives modulated data on $\lambda_9$, and the last ring-detector receives modulated data on $\lambda_{65}$. Note that the 72-element array of ring detectors receives all transported data channels that are input into AWG 122 in FIG. 1.

In one embodiment of the present invention, the edge-coupled detectors are fabricated using silicon-germanium materials, germanium materials, or III-V materials coupled to CMOS silicon chips.

In one embodiment of the present invention, the array of ring modulators is replaced by other nanophotonic resonant structures.

In one embodiment of the present invention, the ring modulators are fabricated on III-V materials and are coupled to waveguide busses on silicon chips.

In one embodiment of the present invention, the ring modulators are fabricated on resonantly-enhanced planar waveguides.

In one embodiment of the present invention, the ring modulators are built in silicon technology and operate in reverse-bias. Note that this integrated optical and electrical silicon solution shares the same scaling characteristics.

In one embodiment of the present invention, the on-chip electronic drivers which interface with the transmitter and receiver arrays are integrated onto the MI chips.

In one embodiment of the present invention, the fiber interface to the chip is integrated onto the MI chip. In another embodiment of the present invention, all components required to make a complete optical transmitter and receiver is integrated onto a single MI chip.

In one embodiment of the present invention, resonant ring modulators fabricated in a compound semiconductor platform (e.g. InP or GaAs) are combined in a hybrid fashion to a silicon chip containing the other optical and circuit components.

In one embodiment of the present invention, a free-space AWG is used above the chip (in the third dimension) to further improve the areal density of the transmitter and receiver array.

The present invention increases the interconnect density for optical interconnects to a chip and enables chip interconnects of about 8 Tb/s in a silicon chip within an area of one square centimeter. The silicon chip provides integrated optical and electrical functionality. The resulting transceiver chip can uniquely achieve:

1. an integrated electrical and photonic solution which yields bandwidths between 4-8 Terabits-per-second;
2. tiny ring modulators that enable dense photonic interconnects;
3. DWDM that enables a single fiber to transport hundreds of data streams from transmitters to receivers;
4. demultiplexing achieved through use of AWGs that enable dense arrays of resonant ring modulators; and
5. data modulation is performed by reverse-biasing the resonant ring modulators to lower power dissipation on-chip and to improve the reliability of the photonic components.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that facilitates optical multiplexing and demultiplexing, comprising:
    an optical transmitter;
    a wavelength-splitting mechanism coupled to the optical transmitter, which separates light wavelengths onto an array of input-optical-waveguide busses within the optical transmitter;
    an array of ring modulators or nanophotonic resonant structures within the optical transmitter, wherein an input-end of each ring modulator or nanophotonic resonant structure in the array of ring modulators or nanophotonic resonant structures is coupled to a corresponding input-optical-waveguide bus;
    output-optical-waveguide busses within the optical transmitter, wherein an output-end of each ring modulator or nanophotonic resonant structure in the array of ring modulators or nanophotonic resonant structures is coupled to a corresponding output-optical-waveguide bus;
    wherein when a modulation signal is applied to a given ring modulator or or nanophotonic resonant structure within the array of ring modulators or nanophotonic resonant structures, a specific wavelength of light is directed to the corresponding output-optical-waveguide bus;
    an external light source which generates a plurality of wavelengths of light, wherein the external light source comprises a bank of distributed-feedback lasers configured in a dense-wavelength-division-multiplexing (DWDM) optical configuration;
    an optical multiplexer coupled to the external light source which combines light wavelengths onto a single-mode fiber, wherein the optical multiplexer is a DWDM multiplexer;
    an optical splitter coupled to the optical multiplexer, which splits the plurality of wavelengths of light into separate beams of light containing all of light wavelengths from the external light source; and
    optical amplifiers, which boost the optical power of the split beams of light, wherein each optical amplifier is an erbium-doped fiber amplifier, wherein the input of each optical amplifier is coupled to the optical splitter, and wherein the output of each optical amplifier is coupled to the optical transmitter.

2. The apparatus of claim 1,
  wherein the wavelength-splitting mechanism is an arrayed waveguide grating (AWG); and
  wherein light wavelengths on each optical-waveguide bus are separated by multiples of the free spectral range of the wavelength-splitting mechanism.

3. The apparatus of claim 1,
  wherein the ring modulators or nanophotonic resonant structures provides coarser separation of light wavelengths than wavelength spacing generated by an external light source; and
  wherein each ring modulator or nanophotonic resonant structure modulates one wavelength of light.

4. The apparatus of claim 1, further comprising a second optical multiplexer coupled to each output-optical-waveguide bus, which recombines the separate light wavelengths onto a second single-mode fiber.

5. The apparatus of claim 1, further comprising:
  a second optical multiplexer coupled to the output-optical-waveguide busses within the optical transmitter, which combines light wavelengths onto a second single-mode fiber, wherein the second optical multiplexer is a dense-wavelength-division-multiplexing (DWDM) multiplexer;
  a second wavelength-splitting mechanism coupled to the second single-mode fiber, wherein the second wavelength-splitting mechanism separates light wavelengths onto a second array of input-optical-waveguide busses within an optical receiver;
  an array of ring modulators or nanophotonic resonant structures within the optical receiver, wherein an input-end of each ring modulator or nanophotonic resonant structure in the array of ring modulators or nanophotonic resonant structures is coupled to a corresponding input-optical-waveguide bus;
  output-optical-waveguide busses within the optical receiver, wherein an output-end of each ring modulator or nanophotonic resonant structure in the given array of ring modulators or nanophotonic resonant structures is coupled to a corresponding output-optical-waveguide bus; and
  edge-coupled detectors located on the output-optical-waveguide busses of the optical receiver and coupled to each ring modulator or nanophotonic resonant structure, wherein each edge-coupled detector detects a corresponding wavelength of light output from a corresponding ring modulator or nanophotonic resonant structure when a DC reverse-bias is applied to the corresponding ring modulator or nanophotonic resonant structure.

6. The apparatus of claim 5, wherein the optical transmitter and the optical receiver are located on a module interface chip.

7. The apparatus of claim 5, wherein the edge-coupled detectors are fabricated using silicon-germanium materials, germanium materials, or III-V materials coupled to CMOS silicon chips.

8. The apparatus of claim 1, wherein changing the modulation signal applied to a given ring modulator or nanophotonic resonant structure modulates data on the corresponding wavelength of light, and wherein the apparatus is configured to direct the corresponding wavelength of light to the corresponding output-optical-waveguide bus.

9. The apparatus of claim 1, wherein the wavelength-splitting mechanism comprises resonant ring modulators or nanophotonic resonant structures.

10. The apparatus of claim 1, wherein the wavelength-splitting mechanism comprises resonant photonic crystal structures.

11. The apparatus of claim 10, wherein the resonant photonic crystal structures are photonic crystal ring resonators or nanophotonic resonant structures.

12. The apparatus of claim 1, wherein the wavelength-splitting mechanism is a free-space grating that separates light wavelengths and is coupled to the array of ring modulators or nanophotonic resonant structures.

13. The apparatus of claim 12, wherein the free-space grating is located above an integrated circuit chip which contains the array of ring modulators or nanophotonic resonant structures.

14. The apparatus of claim 1, wherein the wavelength-splitting mechanism is one of: fiber Bragg gratings, waveguide gratings, thin film filters, and waveguide gratings fabricated on a chip.

15. The apparatus of claim 1, wherein the ring modulators or nanophotonic structures are fabricated on silicon wafers.

16. The apparatus of claim 1, wherein the ring modulators or nanophotonic resonant structures are fabricated on III-V materials and are coupled to one or more waveguide busses on silicon chips.

17. The apparatus of claim 1, wherein the ring modulators or nanophotonic structures are fabricated on planar waveguides.

18. A method that facilitates optical multiplexing and demultiplexing, comprising:
  separating wavelengths of light onto an array of input-optical-waveguide busses within an optical transmitter using a wavelength-splitting mechanism coupled to the optical transmitter;
  directing light from the input-optical-waveguide busses into arrays of ring modulators, wherein an input-end of each ring modulator is coupled to a corresponding input-optical-waveguide bus in the array of input-optical-waveguide busses;
  applying a modulation signal to a given ring modulator within an array of ring modulators to direct a specific wavelength of light to the corresponding a corresponding output-optical-waveguide bus, which is coupled to an output-end of the given ring modulator in the array of ring modulators;
  generating a plurality of wavelengths of light with an external light source, wherein the external light source comprises a bank of distributed-feedback lasers configured in a dense-wavelength-division-multiplexing (DWDM) optical configuration;
  combining light wavelengths onto a single-mode fiber with an optical multiplexer coupled to the external light source, wherein the optical multiplexer is a DWDM multiplexer;
  splitting the plurality of wavelengths of light into separate beams of light containing all of light wavelengths from the external light source with an optical splitter coupled to the optical multiplexer; and
  boosting the optical power of the split beams of light with optical amplifiers, wherein each optical amplifier is an erbium-doped fiber amplifier, wherein the input of each optical amplifier is coupled to the optical splitter, and wherein the output of each optical amplifier is coupled to the optical transmitter.

19. A computer system that facilitates optical multiplexing and demultiplexing, comprising:
- an optical transmitter;
- a wavelength-splitting mechanism coupled to the optical transmitter, which separates light wavelengths onto an array of input-optical-waveguide busses within the optical transmitter;
- an array of ring modulators within the optical transmitter, wherein an input-end of each ring modulator in the array of ring modulators is coupled to a corresponding input-optical-waveguide bus;
- output-optical-waveguide busses within the optical transmitter, wherein an output-end of each ring modulator in the array of ring modulators is coupled to a corresponding output-optical-waveguide bus; and
- an external light source which generates a plurality of light wavelengths, wherein the external light source comprises a bank of distributed-feedback lasers configured in a dense-wavelength-division-multiplexing (DWDM) optical configuration;
- an optical multiplexer coupled to the external light source which combines light wavelengths onto a single-mode fiber, wherein the optical multiplexer is a DWDM multiplexer;
- an optical splitter coupled to the optical multiplexer, which splits the plurality of light wavelengths into separate beams of light containing all of light wavelengths from the external light source; and
- optical amplifiers, which boost the optical power of the split beams of light, wherein each optical amplifier is an erbium-doped fiber amplifier, wherein the input of each optical amplifier is coupled to the optical splitter, and wherein the output of each optical amplifier is coupled to the optical transmitter;
- wherein when a modulation signal is applied to a given ring modulator within the array of ring modulators, a specific wavelength of light is directed to the corresponding output-optical-waveguide bus.

* * * * *